United States Patent [19]

Lundahl et al.

[11] Patent Number: 5,005,342
[45] Date of Patent: Apr. 9, 1991

[54] CROP PROCESSOR

[75] Inventors: E. Cordell Lundahl, Providence; Laurel H. Jensen, Hyrum, both of Utah

[73] Assignee: Ezra C. Lundahl, Inc., Logan, Utah

[21] Appl. No.: 479,321

[22] Filed: Feb. 13, 1990

[51] Int. Cl.$^5$ .............. A01D 34/53; A01D 34/54; A01D 43/10; A01D 55/00
[52] U.S. Cl. ........................... 56/10.2; 56/10.3; 56/14.5; 56/156; 56/192; 56/DIG. 10; 56/DIG. 1
[58] Field of Search .............. 56/14.5, 156, 294, 192, 56/502, 504, DIG. 1, DIG. 10, DIG. 15, DIG. 17, DIG. 20, 10.2, 17.2, 17.1, 10.3, 16.4

[56] References Cited

U.S. PATENT DOCUMENTS

| 2,634,567 | 4/1953 | Huitema | 56/294 |
|---|---|---|---|
| 2,863,023 | 5/1958 | Caldwell | 56/294 X |
| 3,073,100 | 1/1963 | Kingsley | 56/294 X |
| 3,319,408 | 5/1967 | Landwehr | 56/294 X |
| 3,862,539 | 1/1975 | Stevens | 56/504 |
| 3,919,830 | 11/1975 | Gerber | 56/14.5 X |
| 4,251,980 | 2/1981 | Miller | 56/192 X |
| 4,312,177 | 1/1982 | Maier et al. | 56/10.2 |
| 4,414,792 | 11/1983 | Bettencourt et al. | 56/10.2 |
| 4,550,554 | 11/1985 | Lundahl et al. | 56/294 |

Primary Examiner—Stephen J. Novosad
Attorney, Agent, or Firm—Rockey and Rifkin

[57] ABSTRACT

An auger cutter, windrower and conditioner for standing crops such as hay, a cutter and a feed mechanism for feeding forage harvesters crops such as corn and sorghum, including a cutter auger with cutting teeth attached to the auger flight and a conveyor auger to move the cut crop to a central area to be discharged as a window or as a mass of material to be fed to a second crop processing device such as a forage harvester.

29 Claims, 7 Drawing Sheets

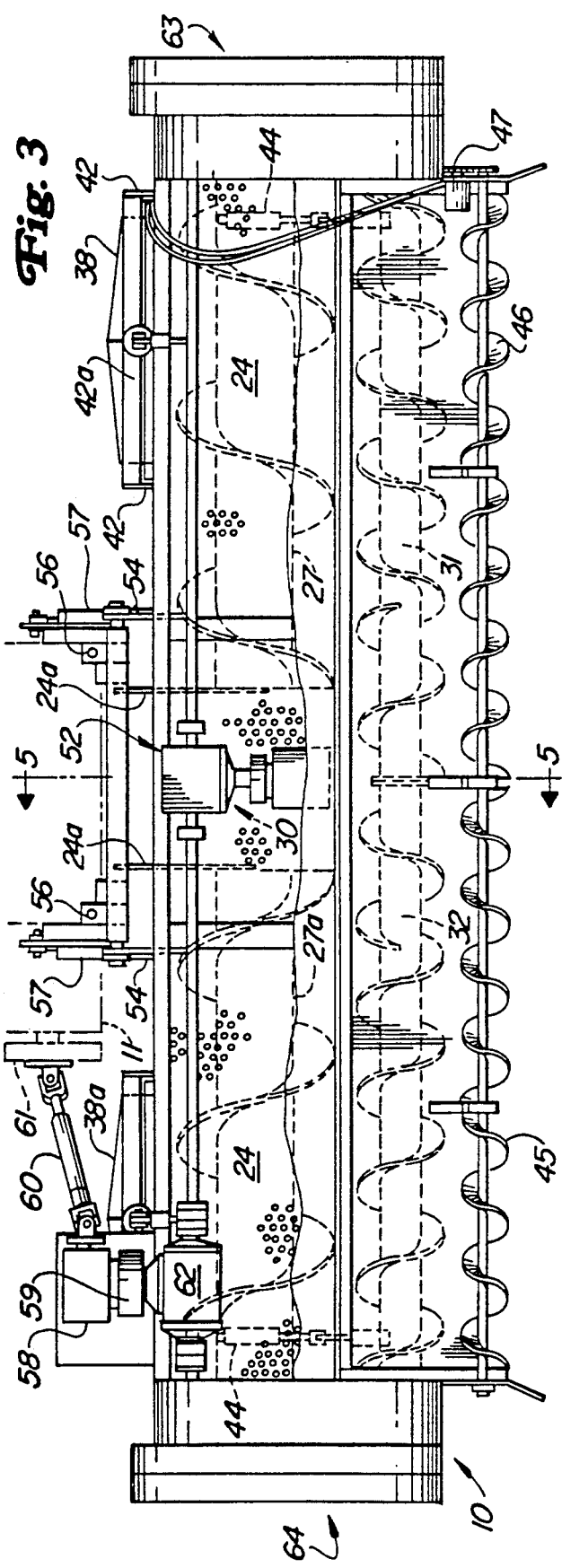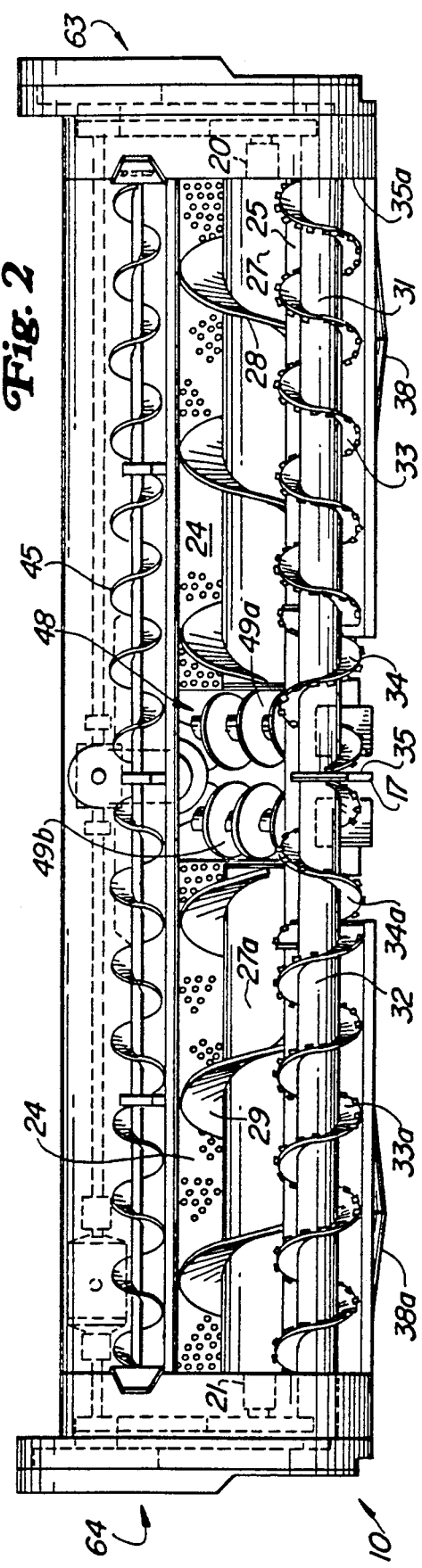

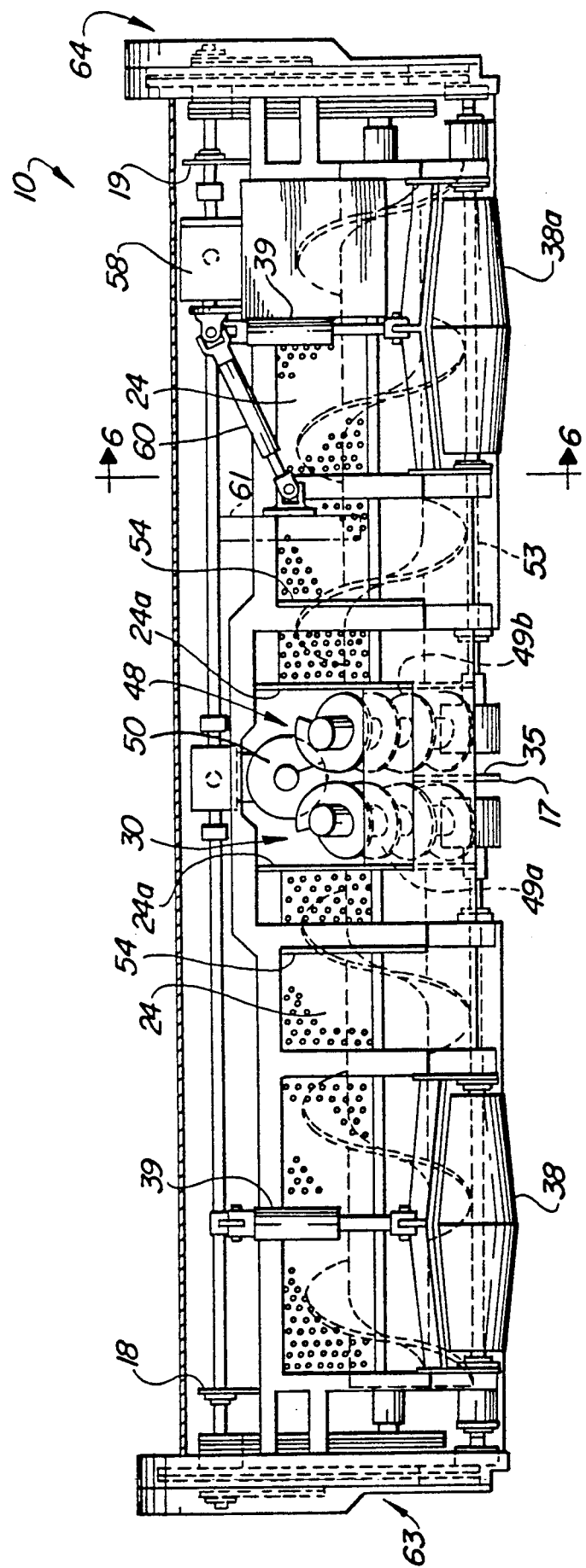

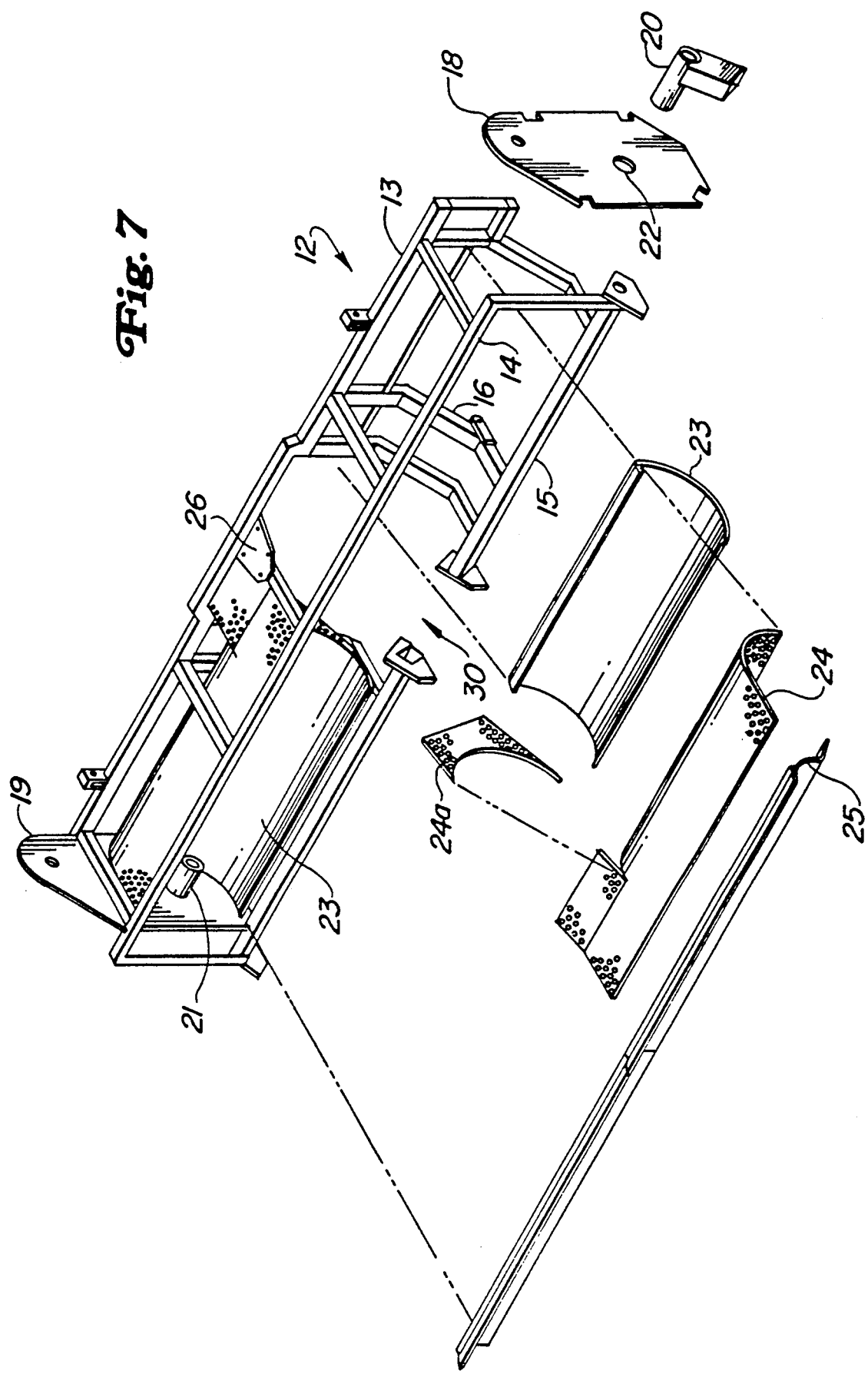

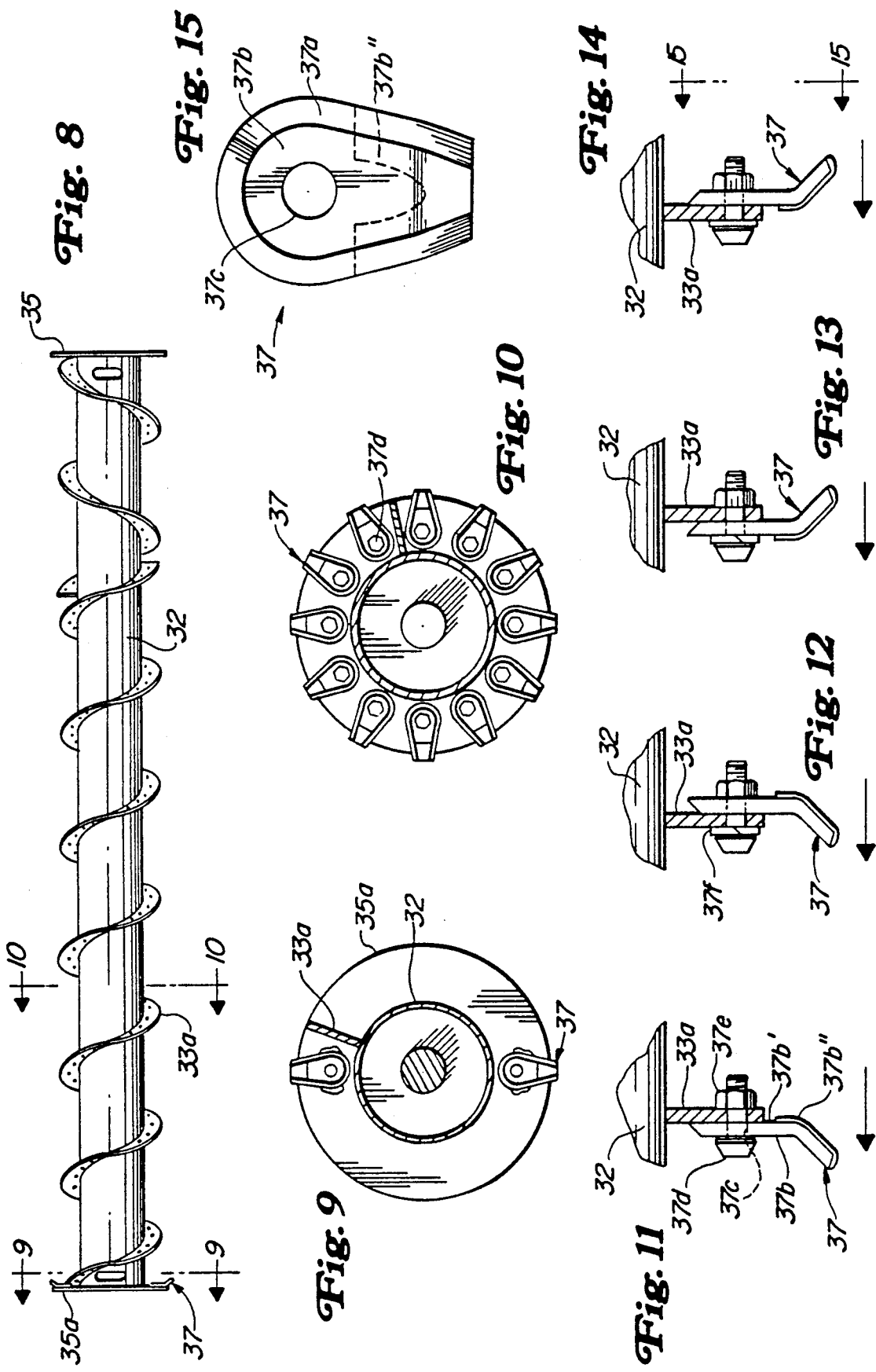

CROP PROCESSOR

FIELD OF THE INVENTION

This invention relates to apparatus for processing crops and particularly for cutting, conditioning, and windrowing standing crops such as hay and grasses and for cutting standing crops such as corn and sorghum and compressing and feeding such crop to a second crop processing device such as a forage harvester.

PRIOR ART

The desirability of auger cutters to cut standing crops has previously been recognized. Such cutters are efficient and generally less susceptible to jamming or plugging than the well-known sickle bar type of cutter. Prior art crop processors include many devices showing auger type cutters of various configurations for various purposes. A prior art cutter or processor developed especially for use with hay is shown and described in U.S. Pat. No. 4,550,554. Prior art cutters for hay had cutting and handling disadvantages and also could not adequately cut and handle large crops such as corn. The cutting mechanism of this invention has been improved in both cutting and handling over the prior art. The crop transfer mechanisms included in this processor are also advanced over the crop processor shown in U.S. Pat. No. 4,550,554 and the references cited therein.

SUMMARY OF THE INVENTION

A principle object of the invention is to provide an auger cutter that will cut standing crop of hay, condition the crop as it is cut to speed the drying process without loss of nutrient value and that will position the crop in windrows for drying and further handling. Another principle object of the invention is to provide an auger cutter that will cut a standing crop such as corn or sorghum and corn, press the crop, and feed the crop after compression into the entrance of a second crop processor such as a forage harvester without loss of crop and at a very rapid rate. Other objects are to provide improved cutting and handling of the crop whether it be hay or corn by utilizing improved cutting mechanisms on an auger cutter and to provide improvement in the feeding mechanisms and discharge mechanisms to feed either the cut crop or a compressed cut crop from the crop processor.

FEATURES OF THE INVENTION

Principle features of the invention include a cutter assembly having an auger cutter with a central tubular shaft and auger flights extending therearound. The auger flights are formed from a flange that is helical around the central shaft and the direction of rotation of the helix is reversed at a selected point on the tube. The cut crop is discharged through an opening in the central area of the processor and in the case of hay is allowed to drop onto the ground in a windrow. Cutting teeth are attached to the flighting near the peripheral outer edge to cut the standing crop at the base of the stalks. The teeth of a novel design are attached in a variety of ways depending upon the crop to be cut and the amount of conditioning which is desired to be accomplished with the crop. The teeth project inwardly or outwardly and in the same direction as the flange of the helix to which they are attached.

A plurality of conveying augers are positioned to receive the crop cut and conditioned by the cutting auger and to convey the crop to a central discharge area for discharge either onto the ground or into a second crop processor depending upon the crop and the ultimate usage of the crop as determined by the desire of the operator. The conveying auger is provided with smooth surface flights formed from a helically wound flange. The rotational speed of the conveying auger is considerably less than the rotational speed of the cutting auger when the cutting auger is being used to cut a crop. There is a central discharge area between the ends of the two conveying augers to provide for the exiting of the crop onto the ground or into the second crop processor.

A support frame carries the cutter auger, the conveyor auger, the drive mechanisms for all augers, and a forward top cover that engages the crop at a preset height to properly angle the crop into the cutter. The top cover cooperates with the conveyor augers to move the crop centrally to the discharge opening and a ground engaging roller provides for height sensing and control and assists in supporting the processor as it travels over the ground.

In one embodiment of the invention, the support frame also carries a power discharge means in the center discharge area which simultaneously compresses and conveys the crop material upwardly and outwardly from the crop processor and forces the crop into the grasping rolls or entrance of a second crop processor. Also in one embodiment of the invention, a third auger means is attached to the front of the front cover and is designed to force the crop, before cutting, toward the center of the crop processor. This auger normally has a more tightly wound helix, rotates at a relatively slow rate as compared with the auger cutter, prevents material from escaping the cutter and ensures that the crop proceeds as rapidly as possible to the center discharge area.

Additional objects and features of the invention will become apparent from the following detailed description, drawings and claims.

DESCRIPTION OF THE DRAWINGS

FIG. 2 is a sectional view taken on the line 2—2 of FIG. 1.

FIG. 3 is a top view of the crop processor.

FIG. 4 is a rear view of the crop processor showing the discharge openings and the roller elements.

FIG. 7 is an exploded view of the frame including cover units and baffle plate.

FIG. 8 is a view of the cutter auger showing the helixes thereon.

FIG. 9 is a sectional view through line 9—9 of FIG. 8.

FIG. 10 is a sectional view taken on the line 10—10 of FIG. 8.

FIGS. 11, 12, 13 and 14 show the attachment of the teeth to the flighting of the cutting auger.

FIG. 15 is a sectional view along line 15 of FIG. 14.

DETAILED DESCRIPTION OF A PREFERRED EMBODIMENT OF THE INVENTION

Figure 1:
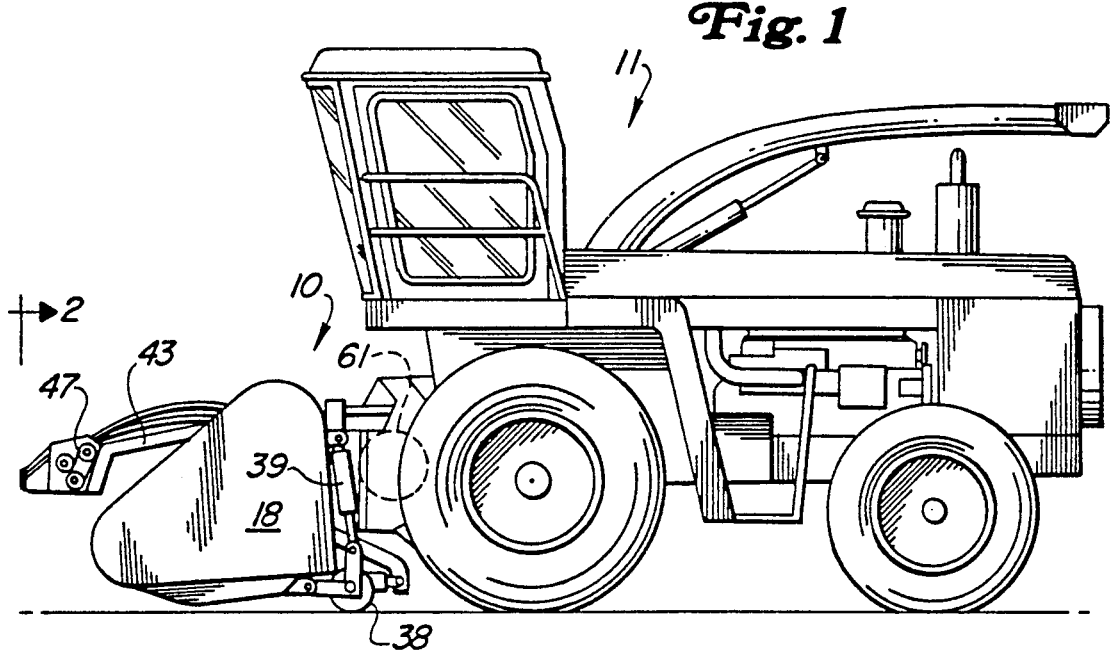
FIG. 1 is a side view of the crop processor of this invention attached to a forage harvester which includes a second crop processor.

Referring now to the drawings: in the illustrated embodiment the crop processor of the invention is shown generally at 10. The crop processor includes the auger cutter and the other operating elements of the crop processor. The crop processor is shown attached to a prime mover and second processor shown as a forage harvester 11. The crop processor 10 includes a support frame 12 shown best in FIG. 7 comprising a rear top rail 13 formed from a rectangular tube and having end plates 18 and 19 and a center plate 17. There is a bottom front rail 15 and a front top rail 14 which are an integral part of the frame and are connected by support members 16 between the front top rail 14 and the bottom front rail 15. The end plates 18 and 19 are firmly fixed to the support frame 12 at the ends thereof. In addition, there is shown in FIG. 7 the bearing units 20 and 21 which are fitted into the holes 22 in the end plates 18 and 19. Also shown in FIG. 7 are the conveyor auger bottoms 23, the conveyor cover 24 from rear to the top for the conveyor augers 27, the side plates 24a to close off the exit for the central discharge area. There is also shown the baffle plate 25 in FIG. 7. FIG. 7 shows the support for the drive unit to drive the power discharge units. This plate is numbered 26. The open, generally central discharge area is designated as 30 and is seen very clearly as an open area in FIG. 7.

As seen in FIGS. 2, 3 and 4, a pair of cutting augers shown generally at 31 and 32 extend between the end plates 18 and 19. Each auger has a shaft that is journalled at the respective end plate and at the center plate 17 for rotation and is driven by pulleys and drive belts exterior to the end plates shown generally in the enclosures 63 and 64. The pulley drive units and the belts associated therewith are not shown in detail but are the kind well known to those skilled in the art. The cutter augers have oppositely turned helical flanges 33 and 33a to move the material toward the center or discharge area. There are reversely turned flanges 34 and 34a at or near the discharge area which are turned out of end plates 35 and 35a. The cutting augers 31 and 32 are so located that their central axes are parallel to the central axes of the conveying augers and are spaced therefrom so that adequate clearance is provided between the helical flanges of the two sets of augers. A plurality of teeth 37 to be further described are attached to and project around the peripheral edges of the flange plates 34, 34a, 35, and 35a. The cutter augers are beneath and forward of the conveyor augers during travel of the unit 10 in the cutting and processing of standing crops.

In prior auger cutting devices plates have been used between the cutting augers and the conveying augers to guide material into the conveying auger. Such a cover plate is described in U.S. Pat. No. 4,550,554, Column 4, lines 48 through 55. Such a plate has previously permitted both crop accumulation on the plate and ejection forward of the crop material collected in the conveyor auger housing.

It has been found that the shape and locations of this plate is critical to proper operation of the processor. The upper edge of the baffle plate must be placed in close proximity to the cutting auger and the best operation has been with the plate being located not more than 0.5 inches from the teeth of the cutting auger, yet not impacting the teeth. The baffle plate must also be shaped between the radius of the cutting auger or the conveyor auger for best operation.

Figure 6A:
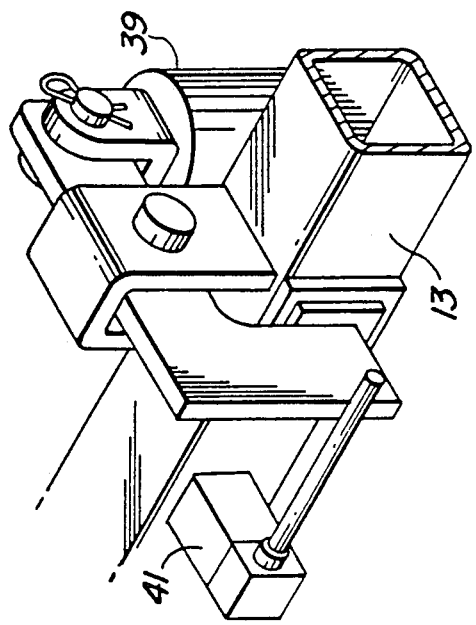
FIG. 6a is an expanded view of the switch 41 and the mechanism controlling it.
Figure 6:
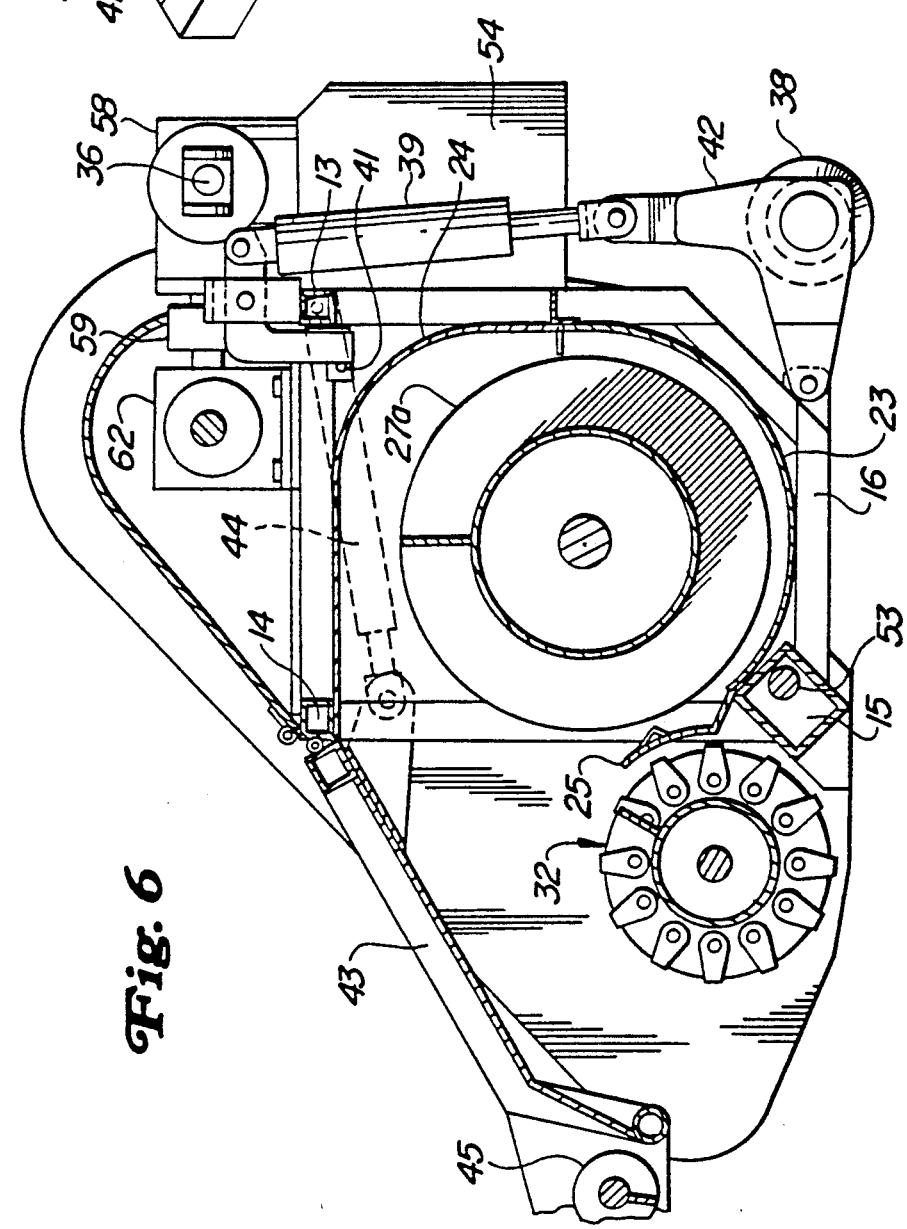
FIG. 6 is a sectional view taken on the line 6—6 of FIG. 4.
Figure 16:
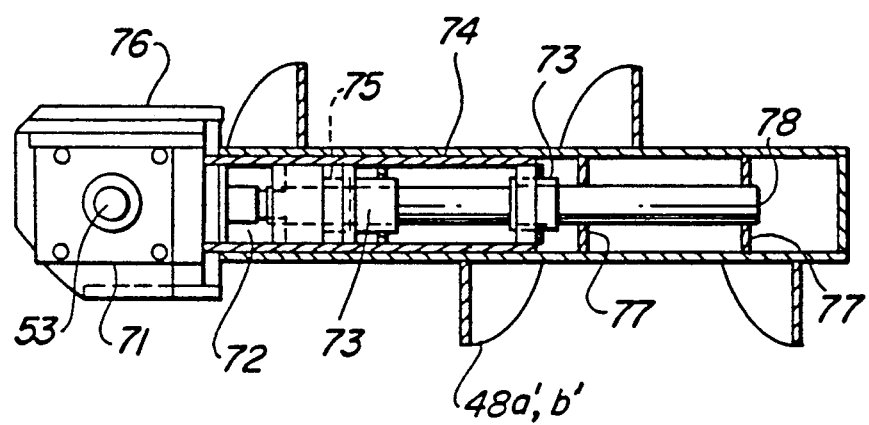
FIG. 16 is a side view of the power auger assembly.

A pair of ground engaging rollers 38 and 38a are each controlled by an independent mechanism which allows each side of the processor to be raised or lowered by some predetermined amount independently of each other. These rollers must have sufficient surface area to support at least a portion of the weight of the processor. The processor is raised and lowered by the hydraulic system of the prime mover and in most instances this system will be able to support a portion of the weight of the processor. The rollers 38 and 38a have a tapered design which allows the roller to clean itself as it rolls. The tapered design also permits turning corners with a minimum disturbing of the soil. The cleaning action results from new material being picked up, forcing already adhered material to be pushed along the taper and out toward the outward ends of the roller. The adhesion between the soil or other material and the roller surface is also weakened by any lateral movement of the processor until the material finally drops off the end. By having the tapered design, most of the wear occurs at the center of the roller and this area can be easily hardened for longer wear. The rollers are connected to the bottom support member 16 by plates 42 which permit the pivoting about the center point of the roller 38 as shown in FIG. 6. The roller is attached to the plate 42 via bars 42a which are connected to hydraulic cylinders 39 which are connected to switch means 41 in such a manner that when the ground engaging rollers 38 or 38a are on the ground, pressure is applied to the cylinder 39 closing the switch 41. This moves front door 43 to the operating position and can inform the operator that the unit is on the ground. The height of cut is maintained by this roller switch mechanism acting in conjunction with the hydraulic cylinder 39. The tilt and selected cutting height of the processor can be set by the operator from the main control as the speed, crop conditions, and/or contour of the land changes.

There is a further important part of the processor which is shown in FIG. 6, the door or front cover unit 43. This front cover unit 43 is pivotally hinged about the upper main frame 14 and is pivoted by controlling the cylinders 44. The height of the front door unit 43 above the ground should be adjusted by the operator to ensure that the grass or material to be cut is bent forward the proper amount just prior to being hit by the teeth of the cutting auger. This height will vary depending upon the nature and density of the crop to be cut.

It has been found that in large standing crops such as corn where the material is not to be windrowed but to be fed to a second unit such as a forage harvester, an additional crop moving auger 45 should be attached to the front of the door 43. This crop moving auger ensures that the crop enters the processor and is not lost to the sides as the processor moves through the crop. The crop moving auger 45 as shown in FIG. 3 has a plurality of smooth flightings attached to it. These flightings are helical flanges 46. These helical flanges may be variable and indeed different conditions may require different pitches per foot along the entire auger length. These flanges are wound to move the crop toward the center from each side. It may be necessary in order to determine the proper speed that this auger 45 have variable speed drive. This auger therefore is driven by a hydraulic drive 47 which can be controlled from the cabin by the operator. This auger normally rotates at a much lower speed than the cutting auger. This speed can be controlled and has little relationship to the speed of the crop conveying auger but is closely related to the ground speed of the processor.

The front door must have an automatic control to ensure that during transport whenever the augers are rotating the front door is closed. This automatic door operation can be accomplished by either determining the pressure of the prime mover's hydraulic system with pressure switches or by monitoring the position of the tapered rollers. This latter method is shown in FIG. 6a where the upward movement of the hydraulic cylinder 39 will cause operation of the limit switch 41. Either roller can operate the door based upon whether or not the roller is in a down position. If either roller 38 or 38a is on the ground, this forces the limit switch 41 to be operated and the door is returned to a predetermined operating position. If neither roller of the processor is in contact with the ground, the limit switches 41 are opened and door will automatically be lowered into the transport or safety closed position.

When processing corn or sorghum which is to be fed into a second crop processor, namely, a forage harvester, an entirely different set of problems arises and requires further novel features of this processor. Namely, the push augers or the feed augers 48, which are positioned in the central discharge area 30, may be installed as a removable unit or may be permanently installed in such area. The necessity to force-feed large quantities of material which have been cut by the crop processor into a second processor requires this plurality of feed augers 48. These augers can feed 12 feet or more of crop material forcefully out of the crop processor into a relatively small exit area. These augers serve to compact the material and force the material under extreme pressure from the crop processor into whatever other processor or unit is required to finish the crop processing. The material enters from the side of the conveying auger 27 and 27a into the lower feed augers 49a and 49b. These units have their radially turned flanges directed inwardly and upwardly. The upper auger 50 acts to both compress the crop between the augers 49a and 49b and to feed the crop to the rear of the crop processor. These augers are each placed to form a three sided pattern which terminates at the exit of the processor or the entrance to the next unit.

This feeding mechanism requires a novel header mounting which will be described more fully later, but one that ensures that the feed augers 49a, 49b and 50 are never more than three inches from the entrance augers or grab rolls of the second crop processor. The V-shape of the feed auger unit allows material to enter from either the cutting auger directly or from the cutting auger via the conveyor augers. The conveyor augers move the material toward the feed augers and, under pressure, force the material into the V-shape of the feed augers. The flighting on the augers is such that the material is moved upwardly and inwardly for compression by auger 50 and movement rearwardly for discharge. The power feed augers 49a and 49b in operation are subjected to extreme lateral forces as the large mass of material is fed from the conveying augers into the discharge area. Normal auger mountings failed every time during experimental use and such failure was almost immediate.

The novel auger module was able to withstand all loads during development. The design shown is a modular unit though the entire auger assembly could be one unit. The auger assembly consists of flighting 48a'; a slightly heavier than the usual flighting of a conveyor auger, flighting tube 49a, auger support plates 77 and auger support shaft 78. A coupler 72 is used to transmit the necessary torque to the auger. Radial loading is absorbed by bearings 73. A spacer 75, or a plurality of spacers may be used to transfer the thrust load to the gear box 71 and bearings 73.

Means such as pins not shown, may also be used to retain both bearing 73 and to lock coupler 72 to shaft 78 thereby retaining the auger assembly in position.

The drive system for these augers consists of a T-shaped gear box 52 attached to a chain box 57a which may contain an overload safety device which can be provided by an overload clutch, of any well known type not shown. The lower feed augers 49a and 49b receive their power from the top shaft power source by a belt series to shaft 53. Shaft 53 is carried inside of the main support frame 12 to provide protection from wrapping of material on the shaft.

In this mode of operation, i.e., heavy corn, or where the central discharge area is occupied by a large mass of solid material, provision should be made for releasing the air generated by the rotation of the cutting and conveying augers in the enclosed space.

This air pressure should be released in order for the system to operate efficiently. The air pressure is released in one embodiment of this invention by providing screen means in the top cover 24 and the sides 24a of the discharge opening. The means 24 and 24a are made of a suitably strong screen material which has approximately 50 percent openings and 50 percent material. The holes in the material should be small enough so that alfalfa leaves or small parts of oats will not pass through the holes and also provide that the conveyor and feed augers wipe over the screen. This wiping should ensure that the screen will be completely cleaned approximately every three revolutions of the conveyor auger. This provides for both the release of the air and the capture of all of the material.

Figure 5:
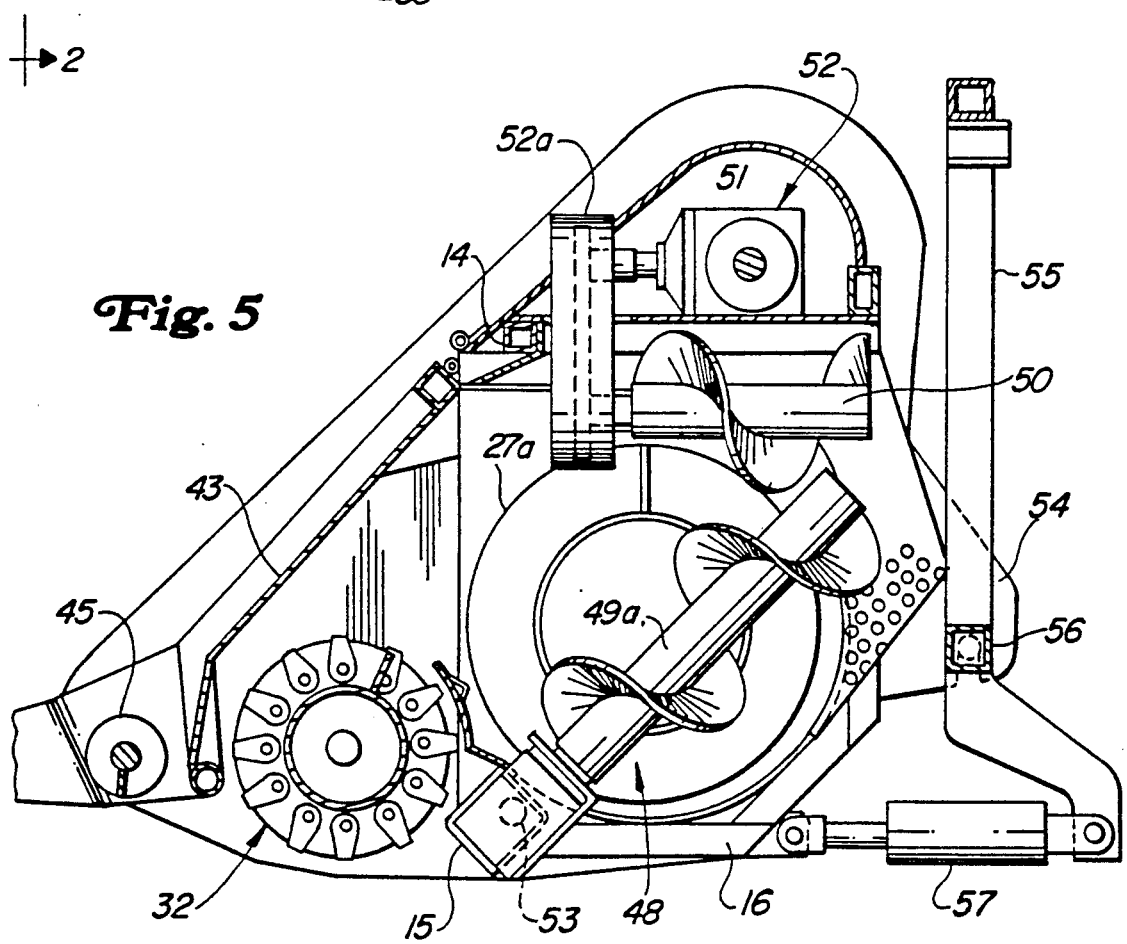
FIG. 5 is a sectional view of FIG. 3 taken on the line 5—5.

The mounting system of this invention is best illustrated in FIG. 5. The mounting system for this crop processor requires that the head or first crop processor has the ability to tilt relative to the second processor. The controls for this tilt are located in the cab, allowing the operator to change the cutting height while moving. It also has been found necessary during tilting of the first processor to prevent any gaps forming between the output means of this processor and the input means to the power source or second processor. The mounting system must also provide means to limit movement of the terminal end of the feed augers away from the input side of the second processor. In addition, the header or first processor as has been previously mentioned must be able to flex up and down on either side with respect to the prime mover and also permit the rollers previously mentioned to travel over a rise in the ground on only one side without stressing the mounting system. The mounting system should be such that attachment and removal are easily accomplished.

The mounting system of this invention is provided by having a frame 55 attached to the chopper head or the second processor head by pins 56 at the four corners. In addition, there are two plates 54 welded to the frame. These plates provide a U-shaped slot on each side of the discharge opening in the processor. The axis of rotation between this frame and the header of the second processor is such that it is centered around the upper corner of the lower frame member of the attached second processor. The force for rotation is provided by two cylinders 57 which is at the lower point 56. The movement of the cylinders is controlled from the cab and can forcefully tilt the header through the frame member and its connection to the lower support frame member 16.

Another operational aspect of this invention is that in many instances the forage harvesters or the second crop harvesters have metal detectors in their chopping unit to stop the forage operation as soon as metal is detected. If metal is detected, the second processor ceases to operate and if material were continued to be fed from the first crop processor, then a jam would occur as there is no place for the cut material to go. In addition, because of the great pressures exerted by the power auger feed system against a fixed surface an intolerable plug would result. To prevent this plugging, a throw out coupler system has been utilized to protect and stop the power input to the second crop processor. The metal detection system is located in the second crop processor and if it senses metal it generates an electrical signal which stops the second crop processor operation. This same electrical signal is connected to the throw out coupler system in the first processor.

The power source 61 from the prime mover 11 is connected to the first gear box 58 of the crop processor by pto shaft 60. This will permit flexing and relative movement between the prime mover unit and the header or the first crop processor. A throw out coupler system 59 is placed between the gear box 58 and the gear box 62 so that the power will immediately be cut by the throw out coupler when the power is cut to the feed system of the prime mover unit.

The teeth 37 used on this crop processor are unique and are best described with reference to FIGS. 11, 12, 13, 14 and 15. The teeth incorporate several features to give the teeth long operational life, impact resistance, versatility, etc. The tooth, of generally horse shoe configuration shown in FIG. 15 in plan view, includes a beveled surface 37a, a hole 37c for mounting the tooth and a flat surface 37b, and the other side is flat surface 37b'. A portion of surface 37b' and the bevel surface at the converging end has a layer of hardened material applied to make surface 37b' the wear and self-sharpening characteristics of the tooth. The tooth is bent at approximately 45° in the direction of the bevel surface. The mounting system for this tooth provides for a plurality of mounting configurations as shown in FIGS. 11, 12, 13 and 14. In FIG. 12, the tooth 37 is mounted by bolts 37d and nut 37e through the hole 37c in the tooth 37 and the flighting 33a. The cutting auger tube 32 is also shown. In each of these figures the tooth is viewed from the front as the tooth is ready to cut the crop material. The mounting bolts have an angle similar to the bevel 37a to provide a slope surface to prevent sticking of the cut material and reduce wear on the bolt. The tooth 37 is designed with a symmetrical pattern. The symmetry results in two cutting edges on each tooth. When one edge is worn down the tooth may simply be reinstalled to a new position on either auger of the machine so that the second cutting edge can be used.

The characteristics of this tooth can be mounted on the front side or the back side of the flighting as shown in FIGS. 11, 12, 13 and 14. As shown in FIGS. 12, 13 and 14 a lock washer 37f is used to maintain the tooth in a fixed position. This permits any fixed cutting angle to be established as desired due to crop, etc. The lock washer in FIG. 14 can be removed from the bolt 37d to permit swinging of the teeth. The front side swinging mount as shown in FIG. 11 provides the most aggressive cutting action and is useful in most cutting situations. The tooth can also be mounted on the backside of the flange as shown in FIGS. 12 and 14; however, in FIG. 12 it must be rigidly mounted. Backside mounting provides a less aggressive action and is utilized in handling tender material. Where the crop material is thicker and more rigid as in the case of corn, front mounting in preferred.

As noted, the present disclosure is based on a preferred embodiment of the invention. Features and advantages other than those specifically pointed out herein will occur to those versed in the art, as will many modifications in the preferred embodiment presented, all without departing from the spirit and scope of the invention.

We claim:

1. A crop processor comprising:
    a support frame coupled to a prime mover;
    a drive system for said processor connected to and powered from said prime mover;
    at least two conveyor augers on a common axis, each including a helical flange thereon, each conveyor auger supported in cantilever fashion on said support frame at opposite ends thereof, each of said conveyor augers being less than half the width of the processor, the helical flange of each conveyor auger wound to move the material toward the center of the processor;
    conveyor auger housings cooperating with said conveyor augers to move the material;
    at least two cutting augers on a common axis;
    support means for each of said cutting augers at the ends and at the center of the processor;
    each of said cutting augers having a helical flange therearound with the flange from the outside turned in the same direction as the conveyor flange for at least a portion of the length of the conveyor auger and a continuation reversely turned flange for the remaining length of the cutting auger to the center of the processor;
    each of said flanges including a plurality of first means for mounting cutting teeth thereon;
    a plurality of cutting teeth;
    second means for mounting each of said cutting teeth to a single one of said first mounting means on said flanges;
    a front cover means pivotally attached to said support means;
    a rear cover means;
    a baffle means attached to and extending from said conveyor auger housing enlarging the volume for conveying the cut crop;
    a center discharge area to discharge cut crop to the rear of said processor;
    means for selecting and maintaining the height of the cutting augers above the ground; and
    whereby the crop is cut by the cutting augers and fed by the conveying augers to the center area for discharge.

2. A crop processor in accordance with claim 1, wherein said first mounting means are located on the flanges of said cutting augers to permit the teeth to extend beyond the periphery of the flange.

3. A crop processor in accordance with claim 2, wherein said front cover means includes means for adjusting the height of said cover to vary the access of the crop to the cutting augers.

4. A crop processor in accordance with claim 3, wherein said front cover adjusting means includes control means for automatically closing said cover when said augers are rotating during transport.

5. A crop processor in accordance with claim 1, wherein said baffle means extends between the cutting and conveying augers and beyond a line connecting the axes of said augers in close proximity to said cutting augers.

6. A crop processor in accordance with claim 1, wherein said means for selecting and maintaining the height of said cutting augers above the ground includes means attached to said support frame and supporting on the ground at least a portion of said processor.

7. A crop processor in accordance with claim 1, where each of said cutting augers has an end plate at each end of the flighting with cutting teeth affixed to the peripheral edge of said end plate.

8. A crop processor in accordance with claim 7, wherein said crop processor has a divider attached to said center support means for said cutting augers to direct the crop to the desired cutting auger.

9. A crop processor in accordance with claim 1, wherein said means for maintaining said preselected cutting height includes sensing means for sensing changes in the contour of the ground, and maintaining said cutting height in response to said changes in contour.

10. A crop processor in accordance with claim 9, wherein said support means and said sensing means includes rollers in contact with the ground.

11. A crop processor in accordance with claim 10, wherein said rollers have a tapered configuration with the larger diameter at the center of said rollers.

12. A crop processor comprising:
a support frame coupled to a prime mover;
a drive system for said processor connected to and powered by said prime mover;
a second crop processor integral with said prime mover a first crop processor including; .
at least two conveyor augers on a common axis, each including a helical flange thereon, each conveyor auger supported in cantilever fashion on said support frame at opposite ends thereof, each of said conveyor augers being less than half the width of the first processor, the helical flange of each conveyor wound to move the material toward the center of the first processor;
at least two cutting augers on a common axis, each of said cutting augers having a helical flange therearound with the flange from the outside turned in the same direction as the conveyor flange for at least a portion of the length of the conveyor auger and a continuation reversely turned flange for the remaining length of the cutting auger to the center of the processor;
each of said flanges including a plurality of first means for mounting cutting teeth thereon;
a plurality of cutting teeth;
second means for mounting each of said cutting teeth to said first mounting means on said flanges;
a front cover means pivotally attached to said support means;
a rear cover means;
a baffle means attached to and extending from said bottom housing enlarging the volume for conveying the cut crop;
a center discharge area to discharge cut crop to the rear of said processor;
a power discharge means in said center discharge area to compress and force the material cut by the processor from said central discharge area; and
means for selecting and maintaining the height of the cutting augers above the ground, whereby the crop is cut by the cutting augers and fed by the conveying augers to the center for discharge.

13. A crop processor in accordance with claim 12, wherein said front cover means includes means for adjusting the height of said cover to vary the access of the crop to the cutting augers.

14. A crop processor in accordance with claim 13, wherein said front cover adjusting means includes control means for automatically closing said cover when said augers are rotating during transport.

15. A crop processor in accordance with claim 12, wherein said first mounting means are located on the flanges of said cutting augers to permit said teeth to extend beyond the periphery of the flange.

16. A crop processor in accordance with claim 12, wherein said baffle means extends between said cutting augers and said conveying augers beyond a line connecting the center points of the axes of the augers in close proximity to said cutting augers.

17. A crop processor in accordance with claim 12, including means attached to said support frame and supporting from the ground at least a portion of said first processor.

18. A crop processor in accordance with claim 12, wherein said power discharge means includes a plurality of augers transverse to said conveying augers whereby the crop is compressed and forcefully discharged from said first crop processor to said second crop processor.

19. A crop processor in accordance with claim 18, wherein said plurality of augers consists of three power augers interacting with each other to compress and forcefully move the material from the conveyor augers to discharge into said second crop processor.

20. A crop processor in accordance with claim 19, wherein two of said power augers have flightings to direct the crop away from the conveyor augers and upwardly toward the rear of the first processor and the third power auger located above and between said first two power augers having flighting to compress the crop between the third auger and said first two power augers and direct the crop toward the rear of the first processor.

21. A crop processor in accordance with claim 16, wherein said first crop processor includes means for sensing the loss of power in said second processor as a result of detection of metal in said second processor and means responsive to sensing said loss of power to disconnect power to said first processor.

22. A crop processor in accordance with claim 12, including mounting means for mounting said first crop processor to said second crop processor to enable said first crop processor to control the cutting height of the cutting augers by rotation of said first processor about the forward member of said mounting means.

23. A crop processor in accordance with claim 18, including means for preventing loss of material during discharge from said first crop processor into said second crop processor, including a plurality of plates between the exit of said first processor and the entrance into said second crop processor.

24. A crop processor in accordance with claim 22, wherein said rotation of said first processor about said mounting means is controlled by means including hydraulic cylinders connected between said mounting means and said support frame.

25. A crop processor in accordance with claim 22, wherein said mounting means includes means to permit vertical variation in the cutting height of said first crop processor.

26. A crop processor in accordance with claim 12, wherein said rear cover means includes means to release the air pressure generated in the confines of said processor by the rotation of the augers.

27. A crop processor in accordance with claim 12, wherein said front cover means includes power driven auger means including helical flanges turned to move the material laterally in relation to the cutting augers.

28. A crop processor comprising:
an auger having flighting therearound;
support means for said auger;
drive means for rotating said auger;
teeth for attachment to said flighting on said auger; and
means for attaching said teeth to said flighting, each of said teeth including a metal base plate of essentially horse shoe shape, having a circular portion and converging side portion, a hole toward the circular end of said base plate for attaching to said auger flighting, said base plate having bevels on a major portion of a first flat surface, the base plate being bent in the direction of said first flat surface, and the second flat surface of the base plate being hard surfaced only on the converging side portion.

29. A crop processor in accordance with claim 28, wherein said means for attachment of said teeth to said flighting is a bolt having an essentially conical head.

* * * * *